United States Patent [19]
Parks et al.

[11] Patent Number: 5,093,911
[45] Date of Patent: Mar. 3, 1992

[54] STORAGE AND RETRIEVAL SYSTEM

[75] Inventors: Carol A. Parks, Monrovia, Md.; Robert E. Probst, Reston, Va.; Doraiswamy Rajagopal, Rockville; Gary L. Youngs, Gaithersburg, both of Md.

[73] Assignee: International Business Machines Corporation, Armonk, N.Y.

[21] Appl. No.: 655,172

[22] Filed: Feb. 11, 1991

Related U.S. Application Data

[63] Continuation of Ser. No. 407,184, Sep. 14, 1989, abandoned.

[51] Int. Cl.⁵ .............................................. G06F 15/40
[52] U.S. Cl. .................................. 395/600; 395/164; 395/166; 364/962; 364/963; 364/963.4
[58] Field of Search ............... 364/518, 521, 523, 200, 364/900

[56] References Cited

U.S. PATENT DOCUMENTS

| | | | |
|---|---|---|---|
| 4,432,057 | 2/1985 | Daniell et al. | 364/300 |
| 4,506,342 | 3/1985 | Yamamoto | 364/900 |
| 4,574,395 | 3/1986 | Kato | 364/518 X |
| 4,604,653 | 8/1986 | Shimizu | 364/518 X |
| 4,635,189 | 1/1987 | Kendall | 364/200 |
| 4,686,620 | 8/1987 | Ng | 364/200 |
| 4,710,870 | 12/1987 | Blackwell et al. | 364/200 |
| 4,745,559 | 5/1988 | Willis et al. | 364/514 |
| 4,748,678 | 5/1988 | Takeda et al. | 364/518 X |
| 4,817,050 | 3/1989 | Komatsu et al. | 364/518 X |
| 4,843,569 | 6/1989 | Sawada et al. | 364/518 |
| 4,897,799 | 1/1990 | Le Gall et al. | 364/518 X |

*Primary Examiner*—Gary V. Harkcom
*Assistant Examiner*—Michael A. Jaffe
*Attorney, Agent, or Firm*—John E. Hoel

[57] ABSTRACT

A system is described in which a user enters a search term at a user location, that search term being associated with a plurality of image objects which are stored at a plurality of geographically diverse locations within the system. The search term is then transmitted to a central index location where there is stored a central index which includes the object name and location and associated data for each of the distributed objects associated with the search term. Optionally, the associated data may be transmitted from the central location back to the user location for display to the user, who can then select which of the several objects or perhaps all of the objects to be accessed from the diverse geographic storage locations. The user can enter his selection at the user location and that selection will be transmitted back to the central index location. In a first embodiment of the invention, the central index location will control the distributed accessing of objects stored at the respective geographically diverse storage sites. In a first embodiment of the invention, the central index location will control the distributed accessing of objects stored at the respective geographically diverse storage sites. In one embodiment of the invention, the plurality of central index entries corresponding to each of the several objects to be accessed, are transmitted back to the user location where control will be effected to access the distributed objects from the respective distributed storage locations. The plurality of objects which are respectively stored at their plurality of geographically diverse storage locations, are accessed and transmitted back to the user location. There, the user may optionally display, print, or store the images of those plurality of objects at the user location.

1 Claim, 5 Drawing Sheets

STORAGE AND RETRIEVAL SYSTEM

This application is a continuation of application Ser. No. 407,184, filed on Sept. 14, 1989, now abandoned.

BACKGROUND OF THE INVENTION

1. Technical Field

The invention disclosed broadly relates to data processing systems and more particularly relates to improvements in distributed image storage and retrieval systems.

2. Background Art

It is desirable to have a central corporate data base for most applications. This is where the master customer file is likely to reside. It is also where most of the corporate applications reside.

As an example, customer automobile insurance underwriting, i.e. the actual determination of the premium and issuing of the policy, is usually a centralized operation.

In determining the premium, miscellaneous documents are scanned into the system and are stored as images, i.e. driver's record, bill of sale, descriptions of special features on the car, etc. These documents, generally standard forms which have been completed, are required for underwiring and copies are kept in case of audit, error or challenges. But, there is very little unique information on the forms, e.g. whether the car has an air bag. The information that feeds the central application is usually decentralized and there is no need to transmit the backup data.

The original documents with the information come into a decentralized office, the information is extracted as coded data from the forms and images are made of the original documents. The distributed office may do the actual underwriting or merely send the coded data to the central location, and the distributed office maintains the original document images.

It is undesirable to ship the images of the original documents because they require fairly large data blocks, cost money to transmit, and they are rarely accessed.

If the customer moves during the policy period, the information about the move is entered into the central database, but the images of the original documents do not need to be moved.

When a customer moves to a new location, a new image file will be opened corresponding to the new location to accumulate images of further documents. However, occasionally it may be necessary to access the original file at the old location is a claim or some other problem occurs.

OBJECTS OF THE INVENTION

It is therefore an object of the invention to store and retrieve images in a data processing system, in an improved manner.

It is another object of the invention to store and retrieve images in a distributed data processing system, in an improved manner.

It is yet a further object of the invention to provide a distributed image storage and retrieval system which has the ability to store image objects at single locations within the system, and yet to be accessible from a plurality of locations in the system.

It is still a further object of the invention to provide an improved, distributed image storage and retrieval system which makes more efficient use of the storage resources in the system, than has been available in the prior art.

SUMMARY OF THE INVENTION

These and other objects, features and advantages of the invention are accomplished by the distributed image storage and retrieval system disclosed herein. In accordance with the invention, the user enters a search term at a user location, that search term being associated with a plurality of image objects which are stored at a plurality of geographically diverse locations within the system. The search term is then transmitted to a central index location where there is stored a central index which includes the object name and location and associated data for each of the distributed objects associated with the search term. Optionally, the associated data may be transmitted from the central location back to the user location for display to the user, who can then select which of the several objects or perhaps all of the objects to be accessed from the diverse geographic storage locations. The user can enter his selection at the user location and that selection will be transmitted back to the central index location.

In a first embodiment of the invention, the central index location will control the distributed accessing of objects stored at the respective geographically diverse storage sites. In a second embodiment of the invention, the plurality of central index entries corresponding to each of the several objects to be accessed, are transmitted back to the user location where control will be effected to access the distributed objects from the respective distributed storage locations.

In either embodiment, the plurality of objects which are respectively stored at their plurality of geographically diverse storage locations, are accessed and transmitted back to the user location. There, the user may optionally display, print, or store the images of those plurality of objects at the user location.

If the objects stored at the respective geographically diverse storage locations correspond to different pel densities for their images, those different pel density images will be transmitted back to the user location. Typically, different pel densities are required for alternately printing an image, displaying an image, or other image manipulation functions.

Another feature of the invention is the queuing of objects accessed at a geographically diverse location, which may be necessary for a delayed transmission to the user location, depending upon data flow control considerations.

DESCRIPTION OF THE BEST MODE FOR CARRYING OUT THE INVENTION

Figure 1:
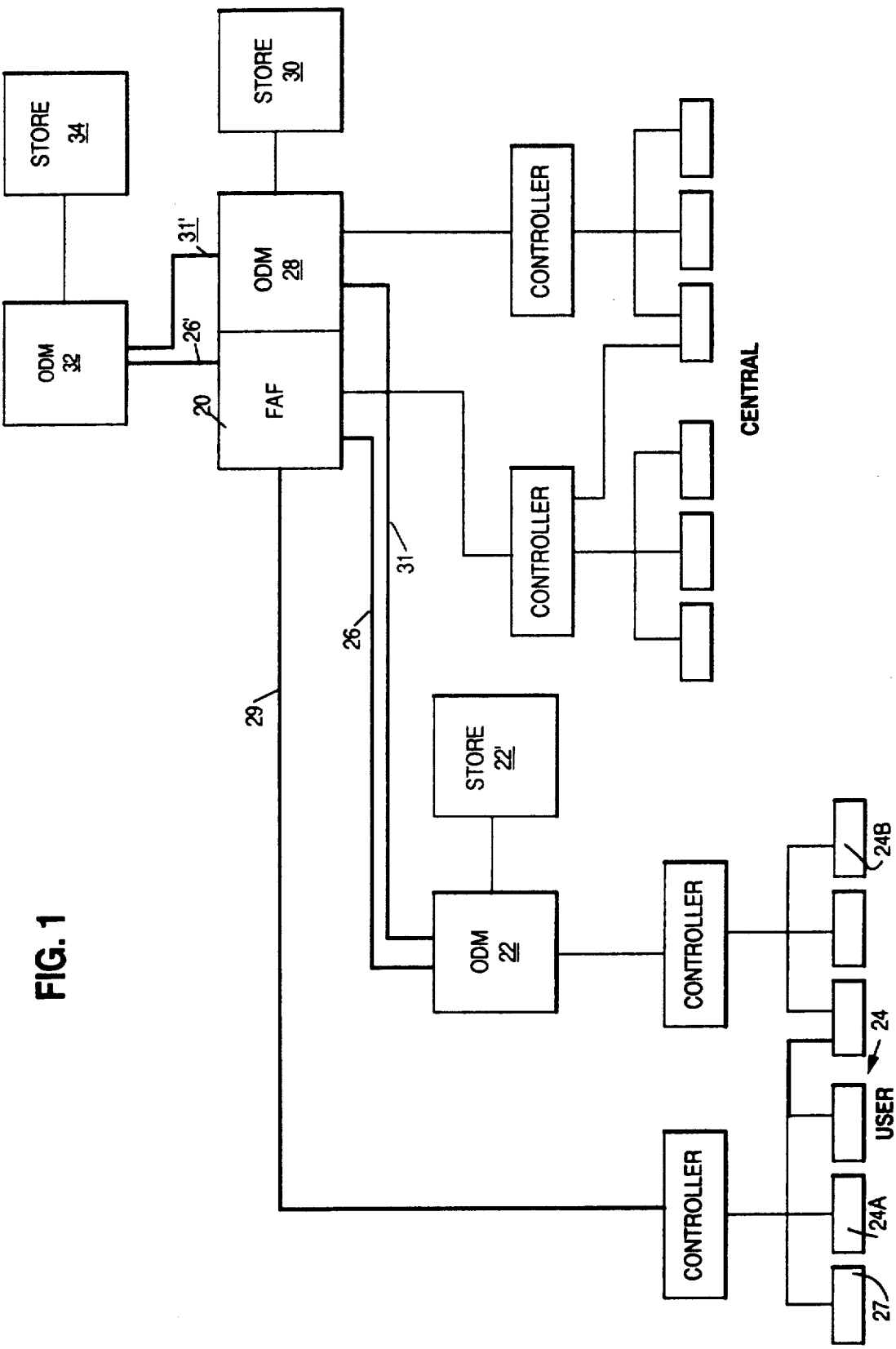
FIG. 1 is a system block diagram showing the connection of FAF to the local ODM 22.

FIG. 1 illustrates an overall system diagram of the distributed image storage and retrieval system. A user alphanumeric display 27 is connected to the central folder application facility (FAF) 20 via a communications line 29.

A central index 20 is embodied in the folder access facility 20 which is connected by means of the communications link 26 to a user facility 22 which is an object distribution manager (ODM) and its store 22'. The folder access facility (FAF), the central index 20 and the object distribution manager (ODM) at the user facility 22 are described with greater particularity in the copending U.S. patent application Ser. No. 559,526 which is a continuation of Ser. No. 211,646, filed June 27, 1988 now abandoned to C. A. Parks, et al. entitled "Dual Density Digital Image System", and Ser. No. 211,722, now U.S. Pat. No. 5,058,185 filed June 7, 1988 to H. M. Morris, et al. entitled "Object Management and Delivery System Having Multiple Object-Resolution Capability," assigned to the IBM Corporation and incorporated herein by reference. ODM 28 is connected to ODM 22 via communications link 31. Connected to the ODM 22 is a user workstation 24. The user workstation 24 may be connected to the ODM 22 and FAF 20 and have an all points addressable image display and alphanumeric character display provided by a single display device. Alternately, and in the embodiment shown in FIG. 1, a separate all points addressable display device 24B is connected to the ODM 22 and is separate from an alphanumeric display and keyboard entry device 24A which is connected to the FAF 20. Both the displays 24A and 24B are a part of the unitary workstation 24.

Also connected to the communications link 31 is a first storage location represented by the object distribution manager (ODM) 28 and its associated storage facility 30 which can be an optical disk storage, a magnetic disk storage, or a combination of the two, as is further described in the copending U.S. patent applications by C. A. Parks, et al., cited above. Still further, a second storage location is represented by the object distribution manager (ODM) 32 and its associated storage 34 connected by link 26' to FAF 20 and by link 31' to ODM 28. A plurality of storage locations such as the ODM 28 and its associated storage 30 can be connected in extensions of links 26 and 31 in the distributed system shown in FIG. 1 and FIG. 3.

Table 1 depicts an example format diagram of the central index which resides in the folder application facility 20 of FIG. 1. The central index is organized so that search terms which have been entered at the workstation 24 at the user location will access corresponding entries which define the object names and the locations of those objects for images stored at a plurality of the storage locations 30 and 34. Each entry in the central index corresponding to a search term, will include one or more object names, the corresponding object location, a description of the contents of the object, and the number of pages represented by that object in its respective storage device. In accordance with the invention, a search term may have corresponding objects stored at a plurality of geographically diverse storage locations. In accomplishing the objects of the invention, a search term will access from the central index a plurality of corresponding entries to access the corresponding plurality of objects from the geographically diverse storage locations, which will then be transmitted back to the user workstation 24 for utilization by the user.

TABLE 1

| | | CENTRAL FORMAT OF CENTRAL INDEX | | | |
|---|---|---|---|---|---|
| SRL # | NAME | TYPE | DESCRIPTION | LOCATION | OBJNAME |
| 0112358 | JONES | AUTO | NEW CAR PURCHASE | ODM28 | JONES 56 |
| 0112358 | JONES | HOUSE | NEW HOUSE PURCHASE | ODM28 | JONES 55 |
| 0112358 | JONES | HOUSE | OLD HOUSE SALE | ODM22 | JONES 54 |
| 0112358 | JONES | AUTO | ADD DRIVER | ODM22 | JONES 53 |

Figure 2:
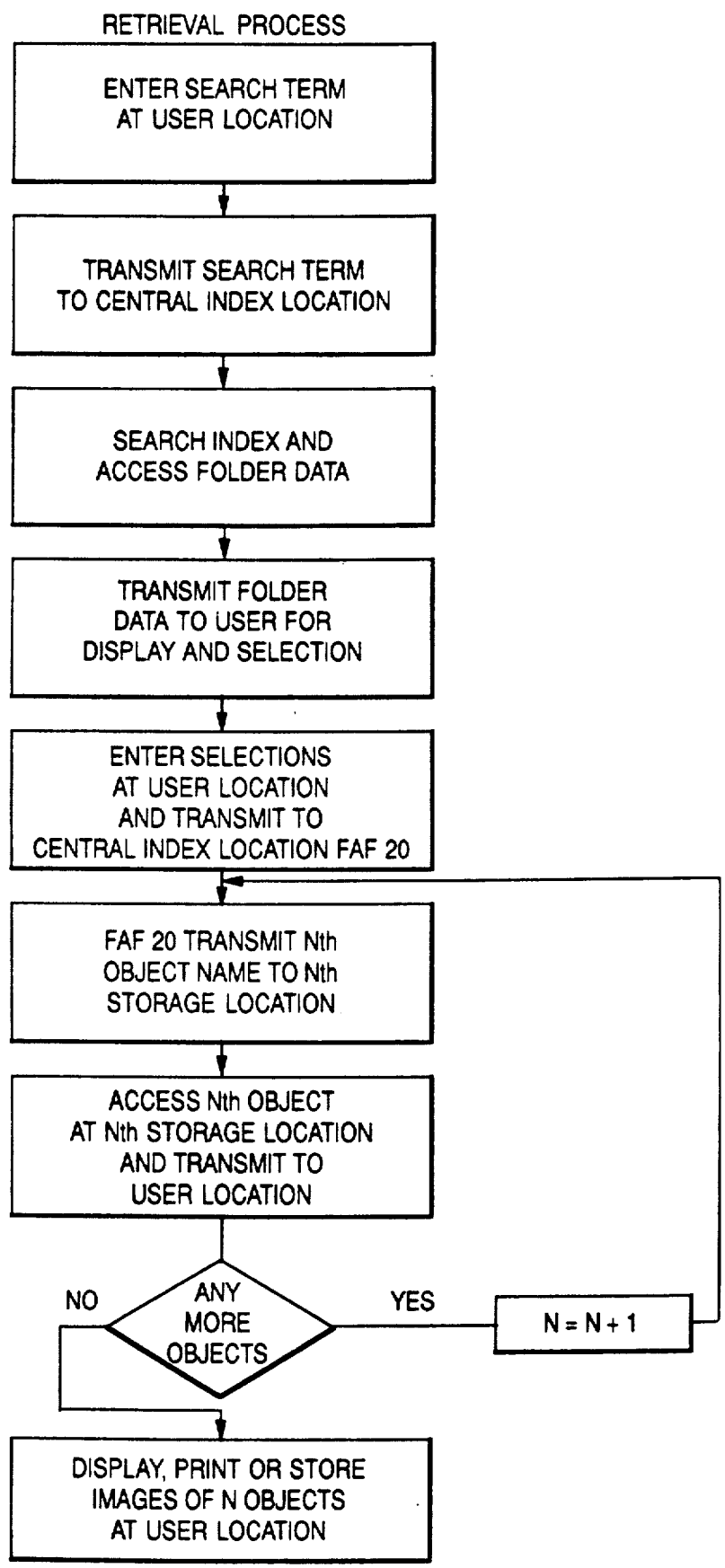
FIG. 2 is a flow diagram of the retrieval process, in accordance with the invention.

FIG. 2 is a flow diagram of the retrieval process, in accordance with the invention. The user at the workstation 27 of FIG. 1 will enter a search term which may correspond to a plurality of image objects which are stored at a plurality of geographically diverse storage locations. The search term is transmitted from the user workstation 27, to FAF 20, over the communications link 29 to the central index in the folder application facility 20. The search term will be used to search the central index at the central index location in order to locate the plurality of object names, the corresponding plurality of storage locations, and the corresponding plurality of associated data for each of the geographically diverse storage locations which contain objects which correspond to the search term.

The folder data in the entries accessed from the central index will be transmitted to the user workstation 27 for display to enable the user's selection. The user can optionally enter his selection at the user workstation 24 and this is communicated over the communications link 29 to the central index location where the folder application facility 20 will implement that selection.

In a first embodiment of the invention, the plurality of storage objects will be transmitted to the object distribution manager 22 at the user location and the FAF 20 will manage the sequential accessing of the geographically diverse storages 30 and 34 (over the communications links 31 and 31') to access the objects stored therein.

In the first embodiment described, FAF has the responsibility to request the images from each of the remote storage locations and route them to the user.

Figure 3:
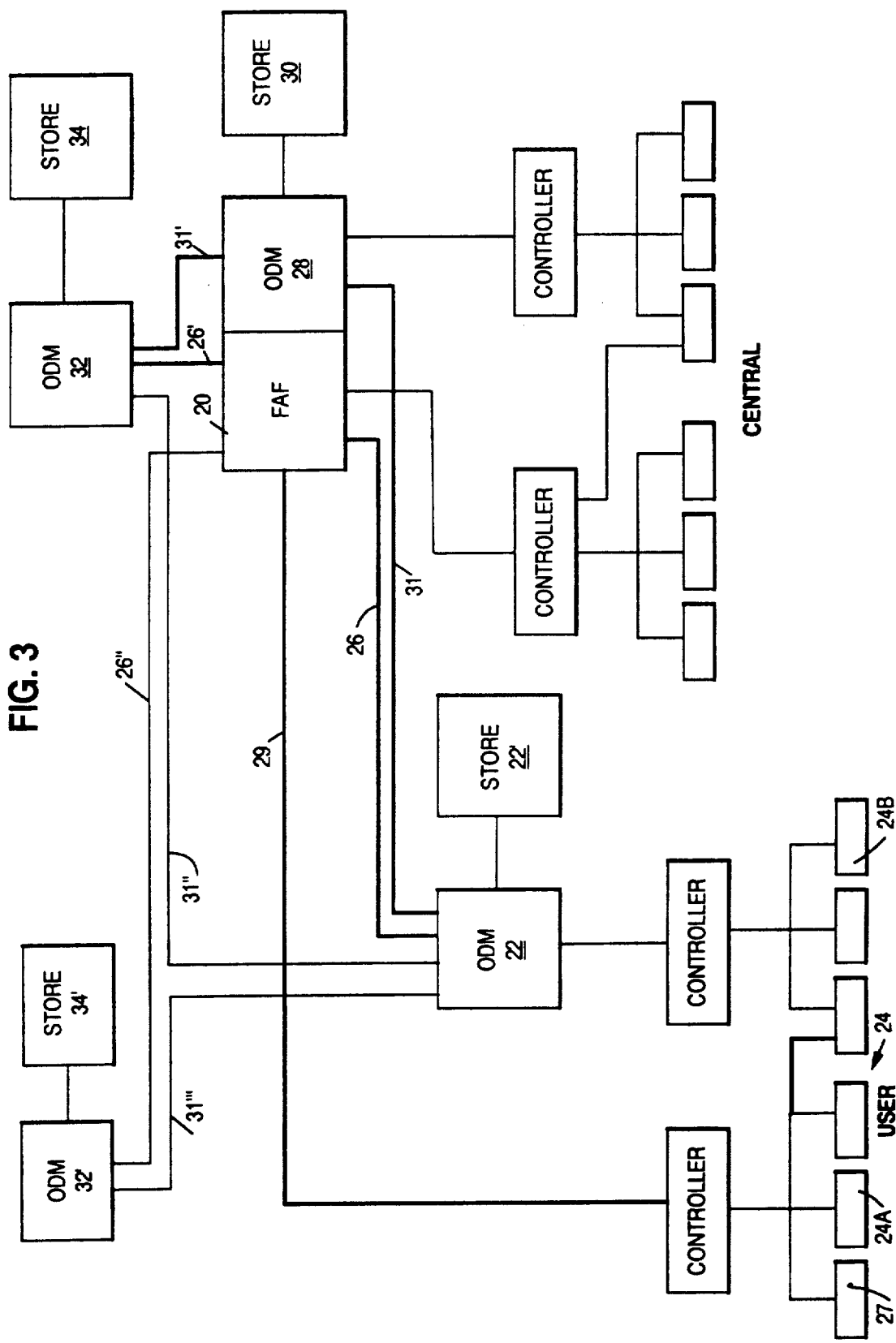
FIG. 3 is a system block diagram of a second embodiment of this invention, showing the connection of the local ODM 22 to the remote ODM 32 and remote ODM 32'.
Figure 4:
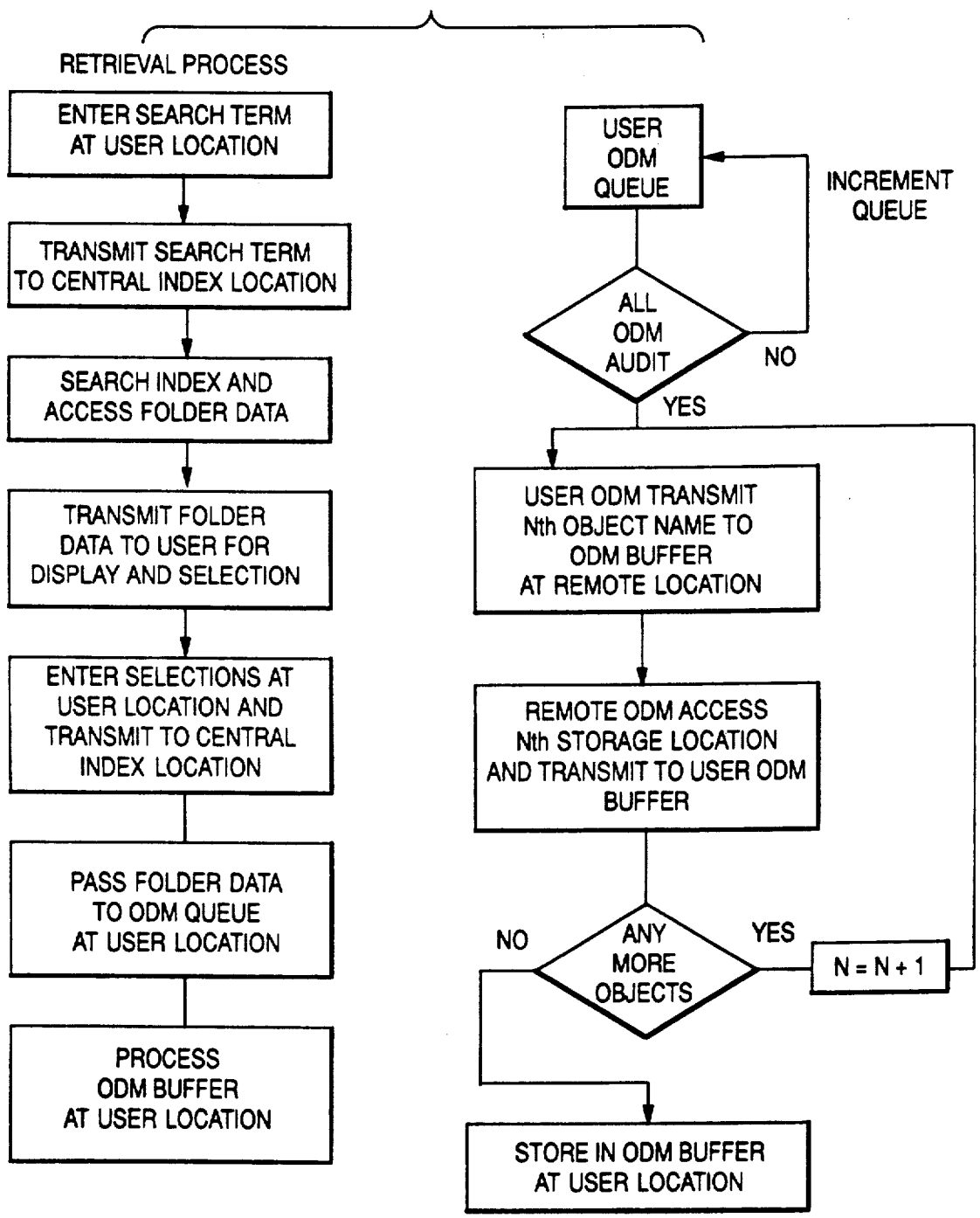
FIG. 4 is a flow diagram of the retrieval process for the second embodiment of the invention.

In the second embodiment shown in FIGS. 3 and 4, FAF passes the location information to ODM facility 22 which assumes responsibility for retrieving the objects from ODM 28, ODM 32 and ODM 32' over links 31, 31" and 31"', respectively. In this mode, the only communications on link 29 is that associated with initial requests from users to the centralized folder facility 20. In this arrangement shown in FIG. 3, all the required addresses and locations are passed from FAF 20 to ODM 22.

From this point ODM 22 takes responsibility for obtaining the distributed objects from ODM 28, ODM 32 and ODM 32' via communications lines 31, 31" and 31"', respectively, and passing them to the user workstation, communications line 26 is not involved after the initialization.

Advantages of the second embodiment are the following. The user ODM 22 can set up queues for sending or receiving. Therefore, if ODM 22 requires a document to be sent or retrieved from a nonavailable, remote ODM, ODM 22 can store the message until that remote system becomes available. Further, since a request from the user for multiple documents usually requires all of them, it is more efficient to collect them in one place before passing them down to the workstation sequentially. In this case, since ODM 22 can handle object size records, it is the logical place to collect them during an unavailability situation. Also, once the process has started, only one communication line 31 is involved in further transactions to remote locations, so there is less likelihood of a communications outage.

The flow for the second embodiment is shown in FIG. 4. In both embodiments, each geographically diverse storage location 30, 34 and 34' which is accessed in accordance with the invention, will transmit to the object distribution manager 22 at the user location, the objects stored at the respective diverse storage locations.

After the objects have been received at the object distribution manager 22 at the user location, the user may optionally display, print or store the images of the plurality of objects at the user location.

The resulting invention enables a greater efficiency in the storage of image objects within the distributed system, by requiring the storage of only a single copy of each object within the system, that copy residing at any designated single geographically diverse storage location.

The images stored at a particular geographically diverse storage location such as the storage 30, can represent a plurality of image pel densities. As one feature of the invention, image objects representing more than one pel density can be transmitted over the communications link 31 to the user location where a first density is used for display, a second density for printing, and other densities might be used for still other image manipulation functions.

In still another feature of the invention, image objects which have been accessed from a geographically diverse storage location may be queued at that location while awaiting the availability of a communications link or a destination node and thereafter the queued objects can be transmitted.

Figure 5:
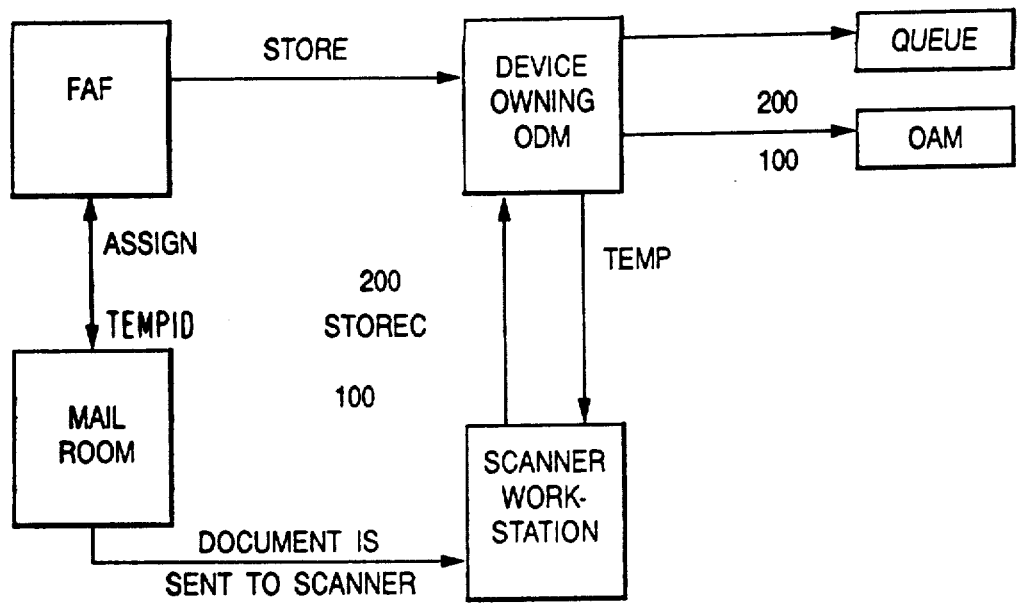
FIG. 5 is a process flow diagram for storing an image in a distributed system, in accordance with the invention.

FIG. 5 illustrates the process flow of storing an object in the distributed system. The steps are as follows:
1. Mail room personnel open mail and use FAF to assign a temporary ID, object name, and data-owning ODM.
2. FAF sends a STORE command to the scanner device-owning ODM identifying temporary ID, object name, and data-owning ODM.
3. The document is transported to the scanner workstation.
4. The scanner operator enters the temporary ID and the scanner workstation sends a TEMP command to ODM to verify correctness of the ID.
5. The scanner workstation transfers the high resolution (200 pel) version of the document to ODM.
6. The device-owning ODM stores the object locally as a distributed copy.
7. The scanner workstation transfers the low resolution (100 pel) version of the document to ODM.
8. The device-owning ODM stores the low resolution version of the document as a distributed copy.
9. If the device-owning ODM is not the same as the data-owning ODM, the low and high resolution versions are transmitted to the data-owning ODM for permanent storage and the distributed copies at the device-owning ODM are deleted.

Figure 6:
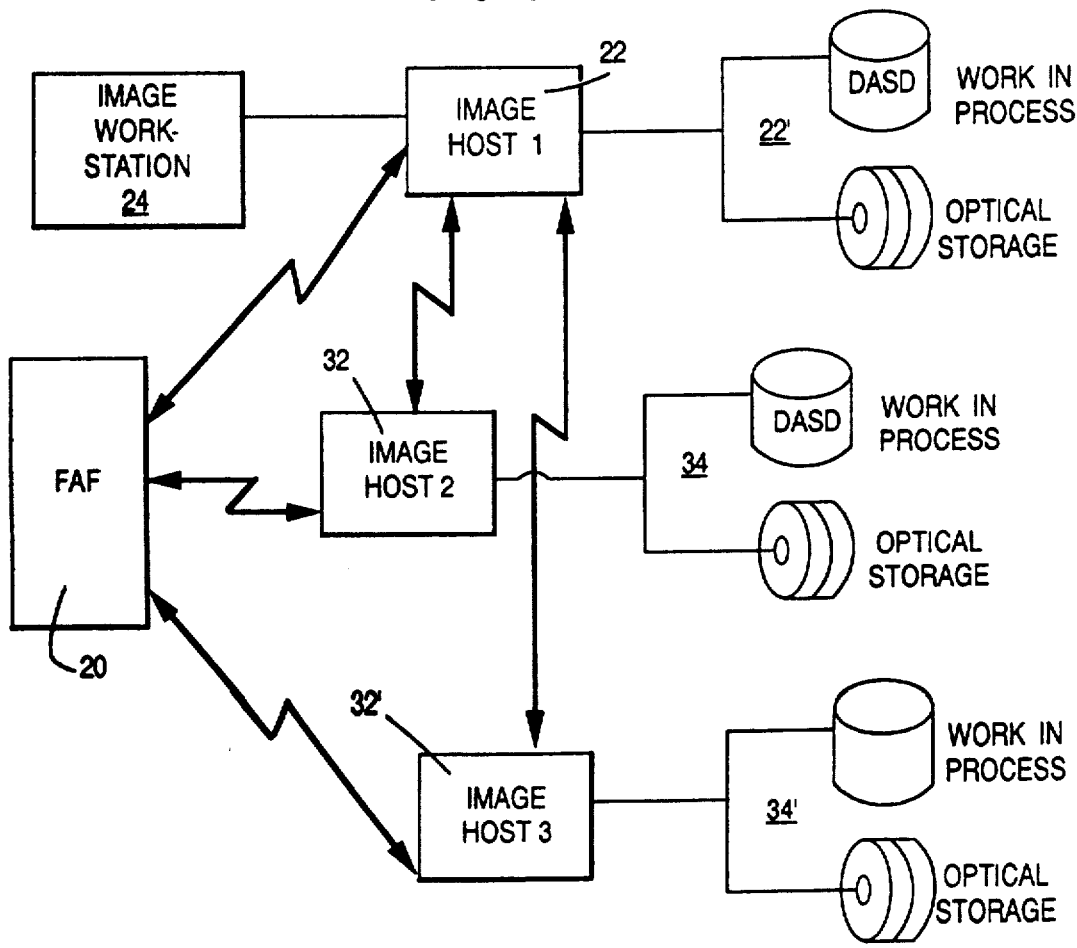
FIG. 6 is a process flow diagram for accessing an image in a distributed system, in accordance with the invention.

FIG. 6 is the command flow for an object access request from an application terminal to an image display workstation for the first embodiment of the invention. The steps associated with this flow are as follows:
1. FAF 20 routes a request to the storage host ODM. The target host is the image host ODM where the document is stored.
2. FAF 20 tells the storage ODM (32, for example) which ODM (22, for example) owns the requesting workstation. The ID of the ODM (22, for example) that is to receive the document and the ID of the FAF (20, in this example) making the request to be notified when the request is complete.
3. The storage host ODM 32 controls the retrieval and storage of objects, communicates data related failures to the FAF 20 and sends command and data to requesting ODM 22.
4. The requesting host ODM 22 controls communication to the document workstation 24, communicates successful completions to FAF 20 and communicates the failures it detects to FAF 20.
5. If the request is successful the first page of the document is displayed at the requesting workstation 24.

Although the specific embodiments of the invention have been disclosed, it will be understood by those having skill in the art that changes can be made to those specific embodiments without departing from the spirit and the scope of the

What is claimed is:

1. In an image object achieving system which includes a database processor storing name and location data records for image objects stored in the system, a first image storage and retrieval processor coupled to said database processor and to a first workstation, and a second image storage and retrieval processor coupled to said database processor and to a second workstation, said first image storage nd retrieval processor being coupled over an image communications link to said second image storage and retrieval processor, a method for storing and retrieving image objects, comprising the steps of:

scanning in a first image object at said first workstation and sending it to said first image storage and retrieval processor;

storing said first image object at said first image storage and retrieval processor and storing a first name and location record in said database processor identifying the name and location of said first image object;

scanning in a second image object at said second workstation and sending it to said second image storage and retrieval processor;

storing said second image object at said second image storage and retrieval processor and storing a second name and location record in said data base processor identifying the name and location of said second image object;

entering a request at said first workstation to access said second image object and sending said request to said database processor;

sending from said data base processor to said first image storage and retrieval processor said second record, in response to said request;

transmitting from said first image storage and retrieval processor to said second image storage and retrieval processor over said image communications link, an access request for said second image object identified in said second record;

accessing with said second image storage and retrieval processor said second image object and transmitting said second image object to said first image storage and retrieval processor over said image communications link, in response to said access request;

sending said second image object from said first image storage and retrieval processor to said first workstation for display at said first workstation.

* * * * *